US008851424B2

(12) United States Patent  (10) Patent No.: US 8,851,424 B2
Barbosa et al. (45) Date of Patent: Oct. 7, 2014

(54) SYSTEMS AND METHODS TO PROVIDE COMPLIANCE WITH STRUCTURAL LOAD REQUIREMENTS FOR AIRCRAFT WITH ADDITIONAL FUEL TANKAGE

(75) Inventors: Weber Brito Barbosa, São José dos Campos (BR); Paulo Henrique Hasmann, São José dos Campos (BR); Luciano Magno Fragola Barbosa, São José dos Campos (BR)

(73) Assignee: Embraer S.A., Sao Jose dos Campos-SP (BR)

( * ) Notice: Subject to any disclaimer, the term of this patent is extended or adjusted under 35 U.S.C. 154(b) by 633 days.

(21) Appl. No.: 13/095,615

(22) Filed: Apr. 27, 2011

(65) Prior Publication Data

US 2011/0272526 A1 Nov. 10, 2011

Related U.S. Application Data

(60) Provisional application No. 61/332,136, filed on May 6, 2010.

(51) Int. Cl.
*B64C 17/10* (2006.01)
*B64D 37/16* (2006.01)
*B64D 37/10* (2006.01)
*B64D 37/04* (2006.01)
*B64D 37/20* (2006.01)

(52) U.S. Cl.
CPC .............. *B64D 37/04* (2013.01); *B64D 37/16* (2013.01); *B64D 37/10* (2013.01); *B64C 17/10* (2013.01); *B64D 37/20* (2013.01)
USPC ................... 244/135 C; 244/135 R

(58) Field of Classification Search
USPC ................ 244/135 R, 135 A, 135 C
See application file for complete search history.

(56) References Cited

U.S. PATENT DOCUMENTS

| 3,788,040 | A  | * | 1/1974 | Bragg et al. ............. 96/164 |
| 6,889,940 | B1 |   | 5/2005 | Howe |
| 7,040,579 | B2 |   | 5/2006 | Howe |
| 7,051,979 | B2 |   | 5/2006 | Howe |
| 7,357,149 | B2 | * | 4/2008 | Howe ................. 137/399 |
| 7,357,355 | B2 | * | 4/2008 | Howe ............. 244/135 R |
| 7,568,660 | B2 | * | 8/2009 | Howe ............. 244/135 R |
| 7,648,103 | B2 |   | 1/2010 | Barbosa et al. |

(Continued)

*Primary Examiner* — Benjamin P Lee
(74) *Attorney, Agent, or Firm* — Nixon & Vanderhye P.C.

(57) ABSTRACT

Methods and systems are provided to comply with structural load requirements applicable to aircraft additional fuel tank systems. A plurality of aircraft fuel tanks may be positioned adjacent to one another, preferably within the fuselage (e.g., a cargo compartment) of the aircraft so as to be disposed generally along a longitudinal axis of the aircraft. The tank body defining an interior space for holding aircraft fuel, an intercommunication conduit assembly between the fuel tank modules configured to refuel and transfer fuel from the tank modules by a cascade mode and an intentional air-filled ullage space are operatively associated with the tank body to prevent an overpressure condition within the interior space of the fuel tank body. The intentional air-filled ullage is obtained through the predetermined positioning of the terminal open end of the intercommunication tube inside the respective fuel tank module. The intentional air-filled ullage can be configured in all or in only some of the fuel tank modules according to the design of the auxiliary fuel tanks or aircraft structural loads requirements.

13 Claims, 10 Drawing Sheets

(56) References Cited

U.S. PATENT DOCUMENTS

| | | | |
|---|---|---|---|
| 7,861,884 B2 * | 1/2011 | Childress et al. | 220/560.01 |
| 2005/0072880 A1 * | 4/2005 | Nolan | 244/136 |
| 2005/0166967 A1 * | 8/2005 | Howe | 137/399 |
| 2006/0278761 A1 * | 12/2006 | Cutler et al. | 244/135 A |
| 2009/0050743 A1 * | 2/2009 | Barbosa et al. | 244/135 A |
| 2012/0025026 A1 * | 2/2012 | French | 244/135 R |

* cited by examiner

SYSTEMS AND METHODS TO PROVIDE COMPLIANCE WITH STRUCTURAL LOAD REQUIREMENTS FOR AIRCRAFT WITH ADDITIONAL FUEL TANKAGE

CROSS-REFERENCE TO RELATED APPLICATION

This application is based on and claims domestic priority benefits under 35 USC §119(e) from U.S. Provisional Patent Application Ser. No. 61/332,136 filed on May 6, 2010, the entire content of which is expressly incorporated hereinto by reference.

FIELD

The embodiments disclosed herein relate generally to aircraft fuel systems, and more particularly, to additional fuel tank systems installed in aircraft fuselages and methods to provide compliance with structural load requirements for the fuel tank structures.

BACKGROUND

Commercial and military transport aircraft are typically designed to carry a given load of passengers, cargo or both, at a given range and/or at a given endurance. Occasionally, the range and/or endurance of the aircraft may need to be increased. Such extended range and/or endurance can be accomplished by installing additional or auxiliary fuel tank systems in the aircraft, typically by positioning fuel tanks physically within the aircraft's fuselage cargo space (i.e., that space within the aircraft's pressurized fuselage which is below the passenger deck). Conventional auxiliary fuel tank systems are typically comprised of additional fuel tanks and their respective equipment, manifolds, and harnesses necessary to manage the additional fuel carried in the tanks.

These additional fuel tanks and systems may be embodied in diverse configurations, for example, with tanks installed under the wings external to the aircraft or with tanks internal to the fuselage. These additional fuel tanks and systems may be configured to directly supply fuel to the engines or to transfer the fuel to other tanks and from there to feed the aircraft engines and/or to be used to control aircraft center of gravity or even to transfer fuel to other aircraft in flight or to other vehicles on the ground.

Auxiliary fuel tank systems are in and of themselves known. For example, it has been proposed in U.S. Pat. Nos. 6,889,940, 7,040,579 and 7,051,979 (incorporated fully by reference herein) to provide auxiliary fuel tank systems that contemplate providing various separate manifold assemblies (e.g., fuel inlet and outlet manifolds, vent manifolds and the like) internally of each tank. By positioning the tank assemblies in adjacent side-by-side configuration, their respective internal manifolds may be connected together to provide a tank system that can be operatively interconnected with the aircraft's on-board fuel management systems.

A difficulty that may be encountered in the conventional auxiliary fuel tank systems noted previously relates to the manifolds that interconnect one tank to another so as to transfer fluids in both directions (i.e., into and out of a respective tank). In case of high accelerations or decelerations in a direction generally parallel to the longitudinal axis of the aircraft (and hence parallel to the row of auxiliary fuel tanks positioned within the aircraft's fuselage), if the fuel tanks are fluid-connected to one another through one or more manifolds and fuel is allowed to migrate from one fuel tank to another in a cascade fashion, the pressure that responsively develops in the last fuel tank(s) in the row of tanks may reach values well above the tank's structural limits. As a result, a real risk of potentially damaging or even rupturing the fuel tank exists.

More recently, U.S. Pat. No. 7,648,103 (the entire content of which is expressly incorporated hereinto by reference) has disclosed an auxiliary tank assembly having a relief manifold assembly mounted internally within the tank body so as to prevent an overpressure condition occurring within the interior space of the fuel tank body due to an excess volume of fuel being introduced thereinto which exceeds the maximum allowable volume of fuel permitted therewithin. The relief manifold assembly thus includes a buffer vessel which defines an internal buffer chamber within the tank body extending upright between the upper and lower walls of the tank body. The buffer vessel includes an aperture located at a lower end thereof near the lower wall of the tank body and exposed directly to the fuel held in the interior space of tank body. A relief valve associated with a relief branch conduit maintains an air column under pressure within the buffer vessel. When the maximum allowable fuel within the tank body is attained, the pressure of the air column will cause the relief valve to open thereby venting the air column therethrough and allowing some fuel to enter the internal buffer chamber and thereby relieve the overpressure condition.

SUMMARY

According to one aspect of the present invention, an aircraft fuel tank is provided which includes a tank body defining an interior space for holding aircraft fuel, an intercommunication line between the fuel tank modules configured to refuel and transfer fuel from them by cascade mode and an intentional air-filled ullage space operatively associated with the tank body to prevent an overpressure condition within the interior space of the fuel tank body.

According to a preferred embodiment, the intentional ullage can be obtained through the predetermined positioning of the intercommunication tube inside the respective fuel tank module with respect to the height of the tank module. The intentional ullage can thus be configured so that the ullage space may be present in all fuel tank modules or simply in some fuel tank modules according to the design of the auxiliary fuel tanks or structural loads requirements.

The fluid intercommunication of the fuel tank modules is accomplished in a cascade manner. By the term "cascade" it is meant that the refueling and/or transferring of fuel, as well as ventilation, from one fuel tank to another adjacent fuel tank, is accomplished by flow of fuel sequentially from one tank to the next in a serially connected set of tanks. The ventilation line is connected in the last fuel tank in the cascade series and thus allows that the air to escape out of the respective auxiliary fuel tank to atmosphere or elsewhere internally of the aircraft.

According to some embodiments, the aircraft fuel tank will include intercommunication conduits positioned external to the tank body, an intercommunication access port on a wall of each tank body to allow access therethrough to the interior space defined thereby, an internal recess located on a bottom and on a top wall of the tank body within the interior space defined thereby, and one or more internal branch lines positioned within the interior space of the tank body.

The vent line assembly will most preferably comprise a vent conduit positioned external to the tank body, a vent access port in the wall of the last refueled fuel tank module to allow access therethrough to the interior spaced defined thereby, an internal recess located on a top wall of the tank body within the interior space defined thereby, and an internal line positioned within the interior space of the tank body and establishing fluid communication between the internal recess and the external vent conduit through the vent access port.

In other aspects, aircraft fuel tank systems are provided which are adapted to being mounted within a fuselage section of the aircraft so as to supplement a main fuel system of the aircraft, the fuel tank systems including at least one fuel tank having a tank body which defines an interior space for containing aircraft fuel and which is sized and configured to be positioned within the fuselage section of the aircraft, at least one fluid interconnection assembly operable coupled to the at least one fuel tank so as to be in fluid communication with the interior space defined thereby; and at least one control box external of the at least one fuel tank and adapted to fluid-connect the at least one fluid interconnection assembly to the main fuel system of the aircraft.

According to the embodiments of the present invention, at least one intentional predetermined air-filled ullage in the tank body is provided so as to prevent an overpressure condition during high decelerations.

A plurality of aircraft fuel tanks may therefore be positioned adjacent to one another, preferably within the fuselage (e.g., a cargo compartment) of the aircraft so as to be disposed generally along a longitudinal axis of the aircraft. In such an embodiment, a forward fuel tank system may be positioned within a forward section of the fuselage compartment, and an aft fuel tank system may be positioned within an aft section of the fuselage compartment. Each of the forward and aft fuel tank systems will most preferably comprise a plurality of the aircraft fuel tanks positioned adjacent to one another and disposed generally along a longitudinal axis of the aircraft.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 12:
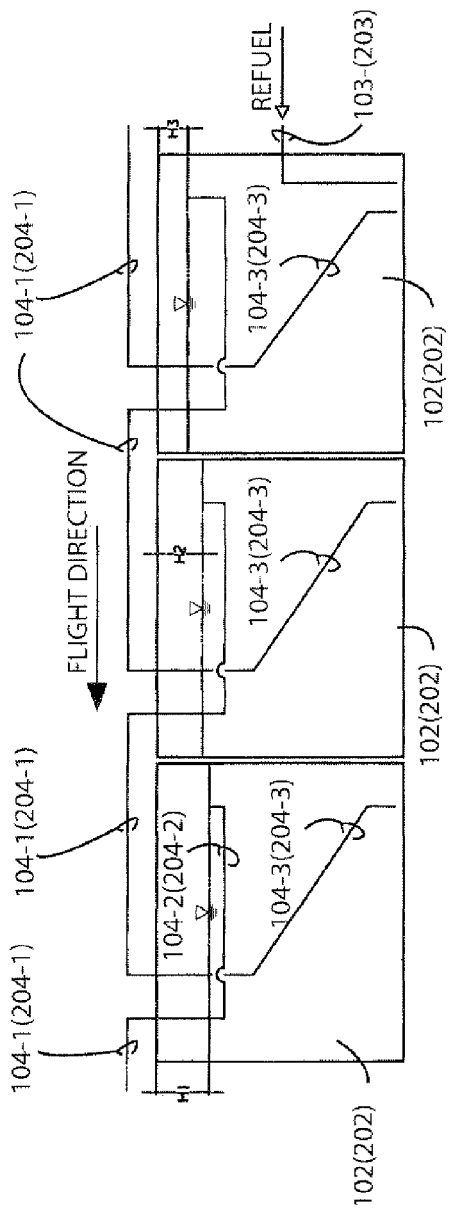
Figure 13:
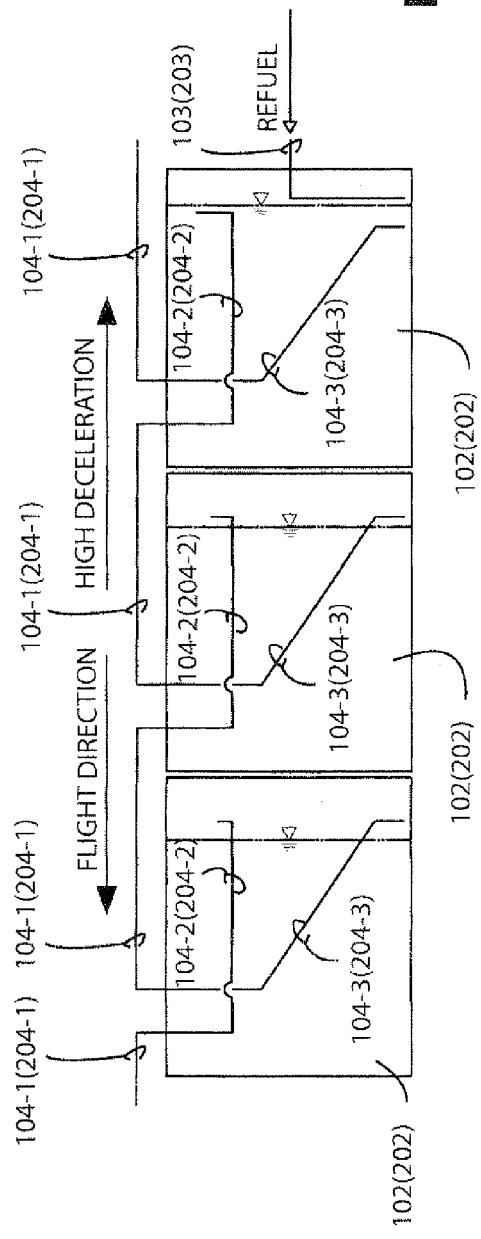

FIG. 12 is a schematic view of the cascade intercommunication system among three of auxiliary fuel tanks modules (forward or aft) depicted during a normal flight or ground attitude and a different intentional ullage volume for each tank; and FIG. 13 is a schematic view similar to FIG. 12 but showing the intentional ullage volume dumping (cushioning) the fuel column and avoiding the overpressure in the most forward fuel tank module during a high deceleration event, for example a negative (−) 9G force along the longitudinal axis of the aircraft.

DETAILED DESCRIPTION

The following disclosure describes modifications, applicable to additional or auxiliary fuel tank systems of aircraft that could improve the production, assembly, installation, inspection and maintenance of such systems and their components.

Many of the details, dimensions, angles and other features shown in the figures of the present patent application are merely illustrative of particular embodiments of the invention. Accordingly, other embodiments can have other details, dimensions, angles and features, without departing from the spirit or scope of the present inventions.

Figure 1:
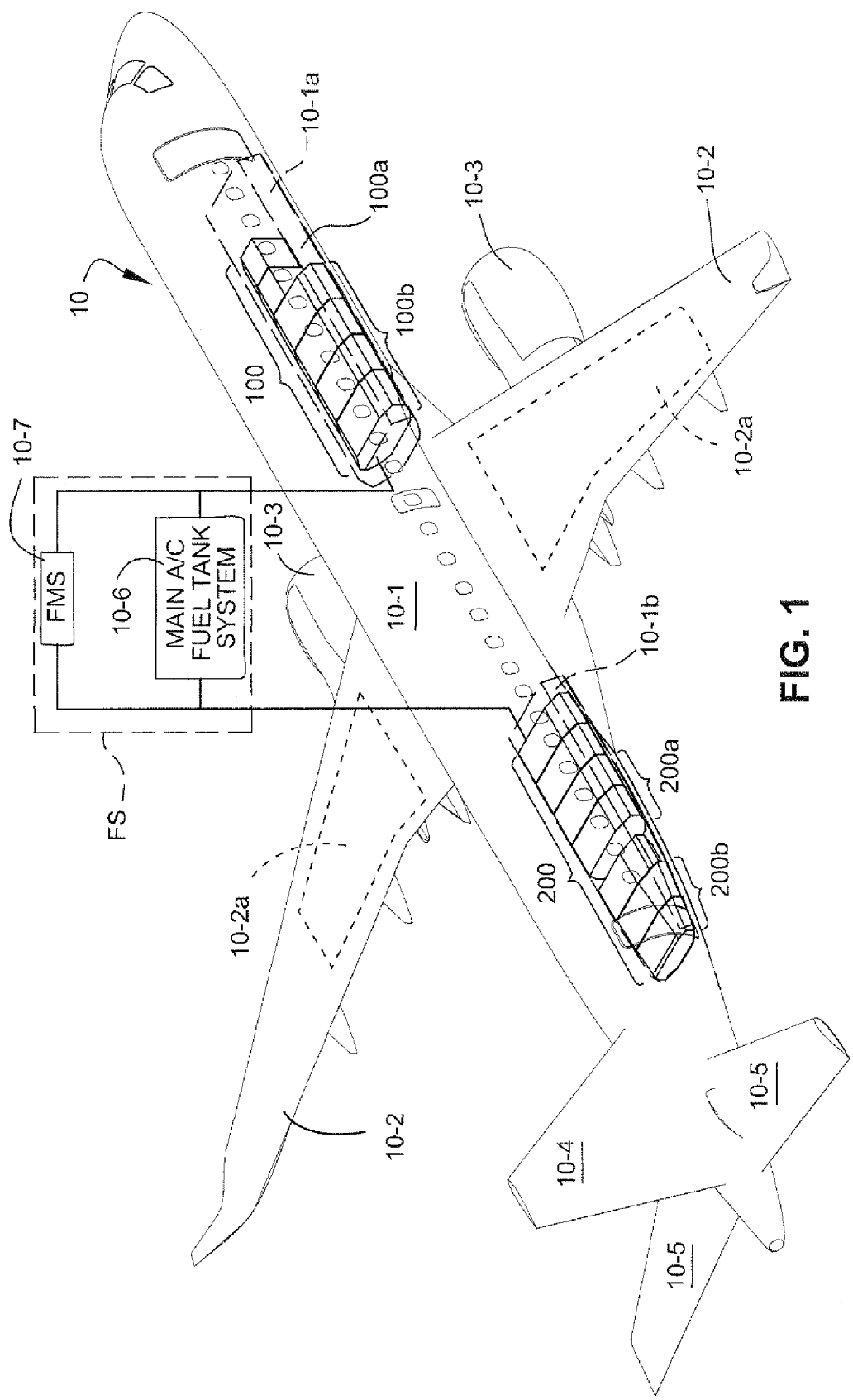
FIG. 1 is a schematic top perspective view of an aircraft with forward and afterward fuselage fuel tank systems in accordance with one preferred embodiment of the present invention.
Figure 2:
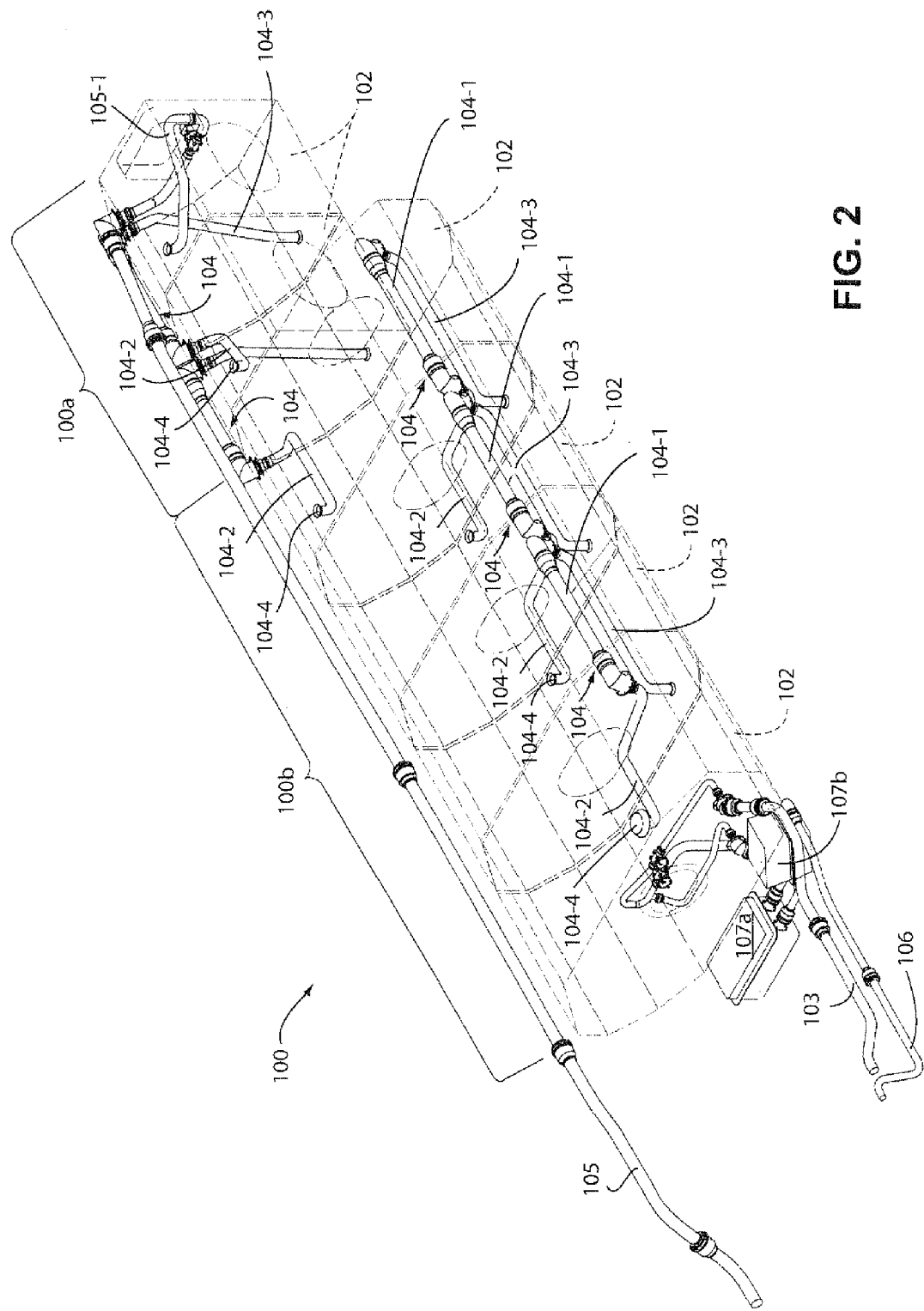
FIG. 2 is a schematic top perspective view of the forward fuselage fuel tank system shown in FIG. 1 and specifically depicts a cascade type intercommunication system between each of the fuel tank modules (intercommunication lines) including the ventilation line, the transfer control boxes, the transfer line and the refuel line.
Figure 3:
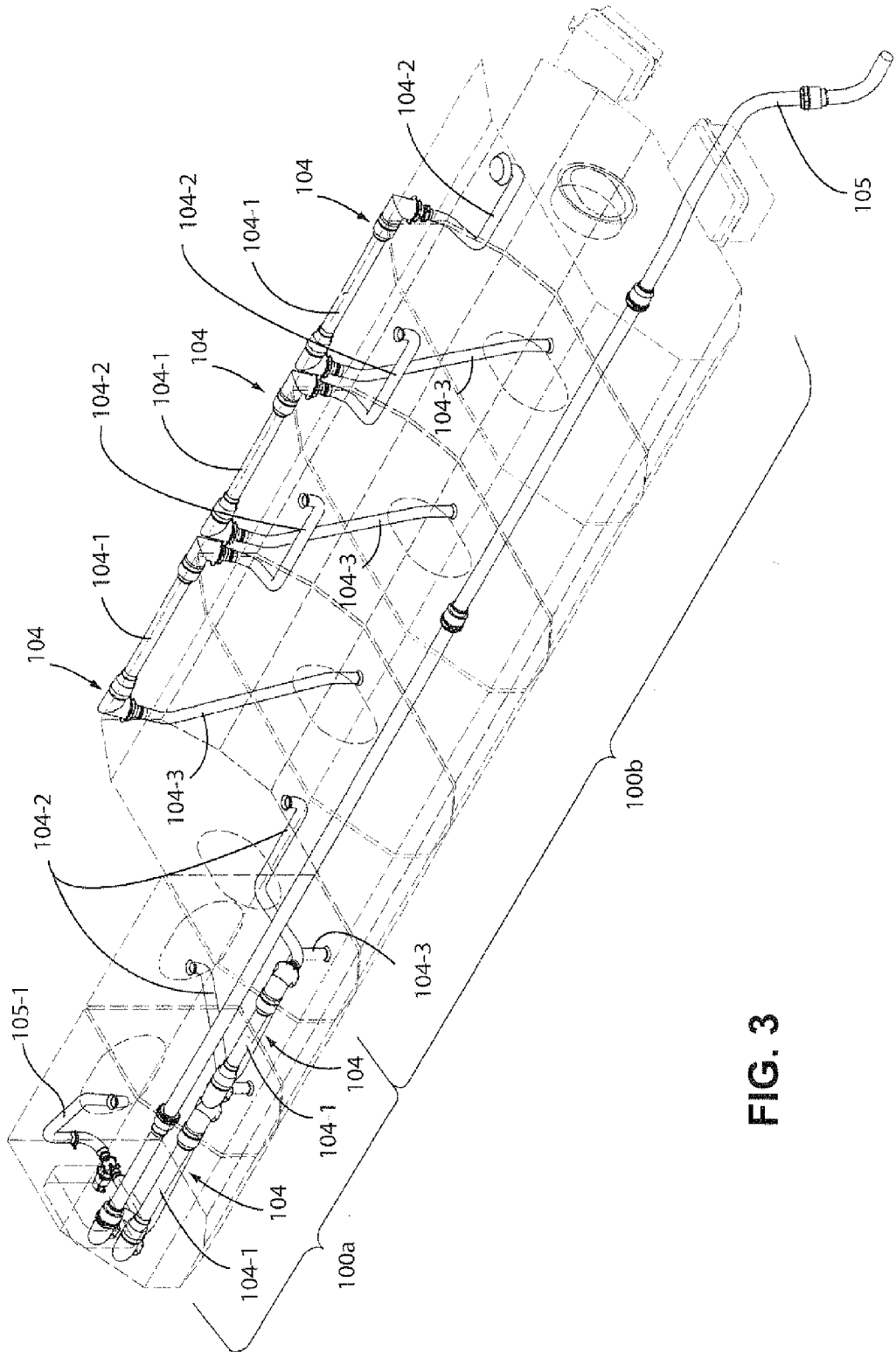
FIG. 3 is another schematic top perspective view of the forward fuselage fuel tank system shown in FIG. 2, showing the tank intercommunication line and the ventilation line.
Figure 4:
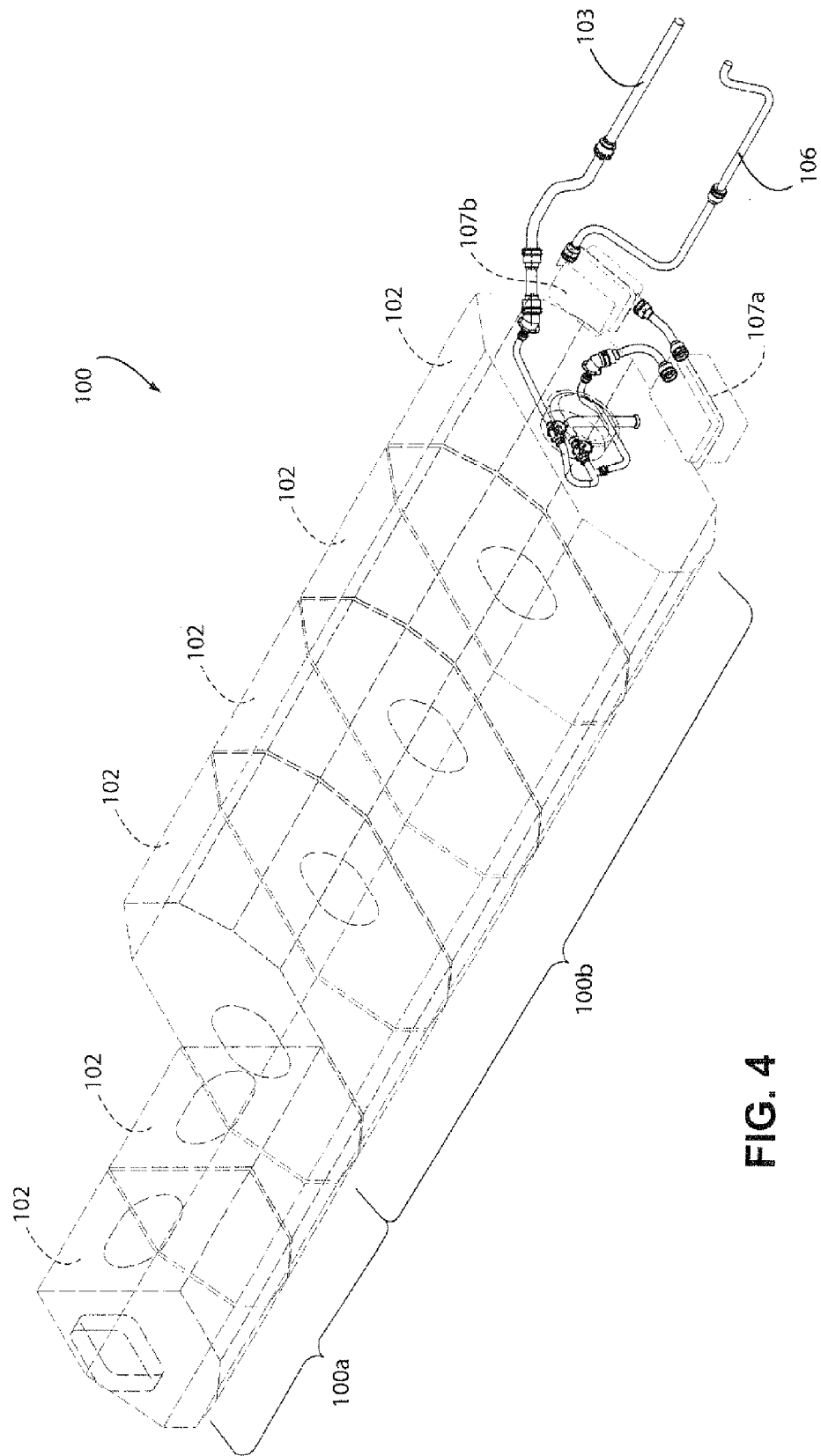
FIG. 4 is a schematic top perspective view of the forward fuselage fuel tank system shown in FIG. 2, but showing only the fuel transfer line and fuel refueling line.

As shown schematically in accompanying FIG. 1, an aircraft 10 has a fuselage 10-1, a pair of wings 10-2 extending generally laterally from the fuselage 10-1 and wing-mounted engines 10-3 to provide the required thrust to the aircraft 10. In this regard, although multiple wing-mounted engines 10-3 are shown, it will of course be understood that the present invention could be utilized satisfactorily with one or more fuselage mounted engines. Stability in the yaw and pitch axes for the aircraft 10 are provided by tail-mounted vertical and horizontal stabilizers 10-4, 10-5, respectively.

As is conventional, the aircraft fuselage 10-1 is provided with forward and aft cargo compartments 10-1*a*, 10-1*b* which are accessed respectively by one or more cargo compartment doors (not shown). Respectively positioned within these forward and aft cargo compartments 10-1*a*, 10-1*b* are a forward fuel tank system 100 and an aft fuel tank system 200 each having a number of individual tanks 102, 202, respectively. Each of the individual tanks 102, 202 comprising the forward and aft fuel tank systems 100, 200, respectively, are most preferably sized and configured to allow for passage through the forward and aft cargo compartment doors for removable positioning within the forward and aft cargo compartments 10-1a, 10-1b, respectively. Of course, if desired the forward and aft fuel tank systems 100, 200 respectively, may be more permanently mounted to the aircraft fuselage structure.

The forward and aft fuel tank systems 100, 200, respectively, are operably interconnected to the aircraft's on-board fuel system FS including, for example, the main aircraft fuel tank system 10-6 (e.g., the aircraft's wing fuel tanks 10-2a and their associated pumps, conduits, level sensors and the like) and the fuel management system (FMS) 10-7 (e.g., the cockpit mounted fuel management instruments, monitors and/or controllers operably coupled to the main aircraft fuel tank system). Interconnection to the on-board fuel management system FMS allows the fuel contained within the forward and aft tank systems 100, 200, respectively, to be monitored and transferred to the aircraft's main fuel tanks as may be appropriate during the flight to ensure that an adequate supply of fuel is provided to the engines 10-3.

Accompanying FIGS. 2-6 depict in greater detail the structural components of the forward tank system 100. As shown therein, the tank system 100 comprises a series of adjacently mounted tanks 102 forming a tank row generally extending along the longitudinal axis of the aircraft 10. The tanks 102 are depicted in dashed line in the accompanying drawing FIGS. 2-6 for the purpose of enhancing visibility of the various tank components to be discussed in greater detail below. It will also be observed that a few of tanks 102 in the forward tank system 100 are of lesser internal volume (identified in FIG. 2 as the tanks in the series 100a) as compared to the remainder of the tanks 102 rearwardly thereof (identified in FIG. 2 as the tanks in the series 100b). Such a size (and hence internal fuel capacity) difference is to allow the tanks to be positioned within the cargo hold adjacent to other aircraft structures and components (e.g., the retracted nose gear) while yet maximizing the available fuel capacity provided by the forward tank system 100.

It will be understood that the particular size and/or shape of the individual tanks employed in either the forward or aft tank systems 100, 200, respectively, is not critical. As such, virtually any size and/or shape of tank may be provided to be accommodated within a variety of aircraft fuselages. As will be understood from the following discussion, therefore, even though one or more of the individual tanks within the forward and/or aft tank systems 100, 200, respectively, may have a different size and/or shape, they will nonetheless possess similar structural subassemblies and functional attributes.

Adjacent pairs of the fuel tanks 102 are interconnected to one another by intercommunication conduit assemblies 104 which include an intercommunication manifold conduit 104-1 positioned exteriorly of the tanks 102. The conduit 104-1 will have one end fluid connected to an inlet conduit 104-2 and its other end fluid-connected to a discharge conduit 104-3. Each of the conduits 104-2 and 104-3 is positioned within the internal space of a respective one of the adjacent pairs of tanks 102.

Figure 6:
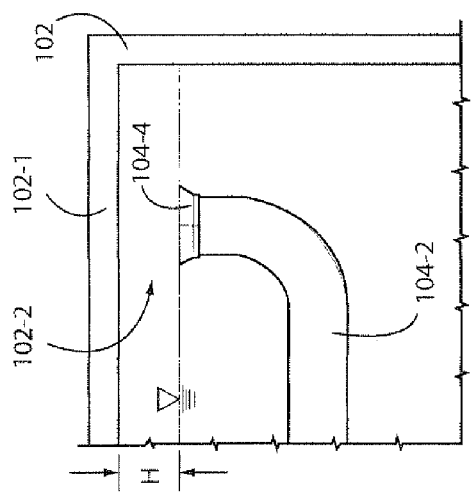
FIG. 6 is a schematic detailed view of the tank depicted in FIG. 5 to maintain the ullage configuration whereby the quantity of the ullage can be configured for each module in equal or different values of ullage volume by preselected setting of the dimension "H"
Figure 5:
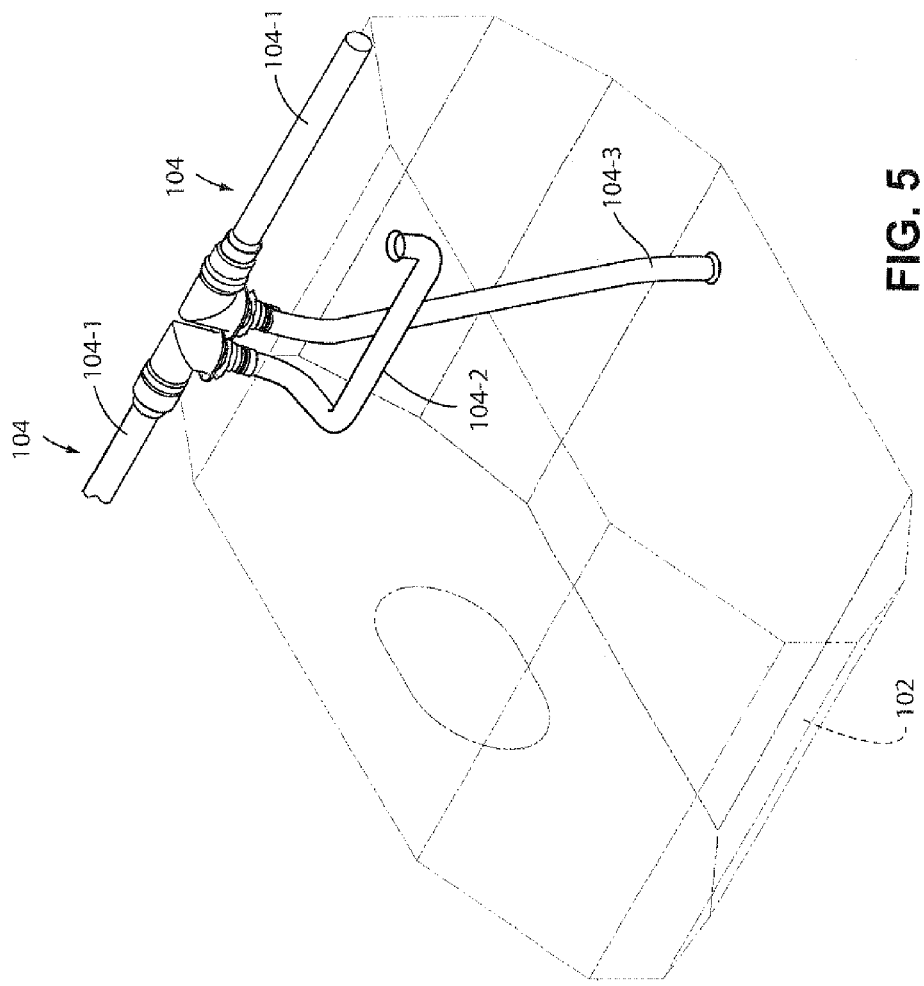
FIG. 5 is a schematic top perspective view of the forward fuselage fuel tank system shown in FIG. 2, but showing only the tank with an ullage relief configuration.
Figure 7:
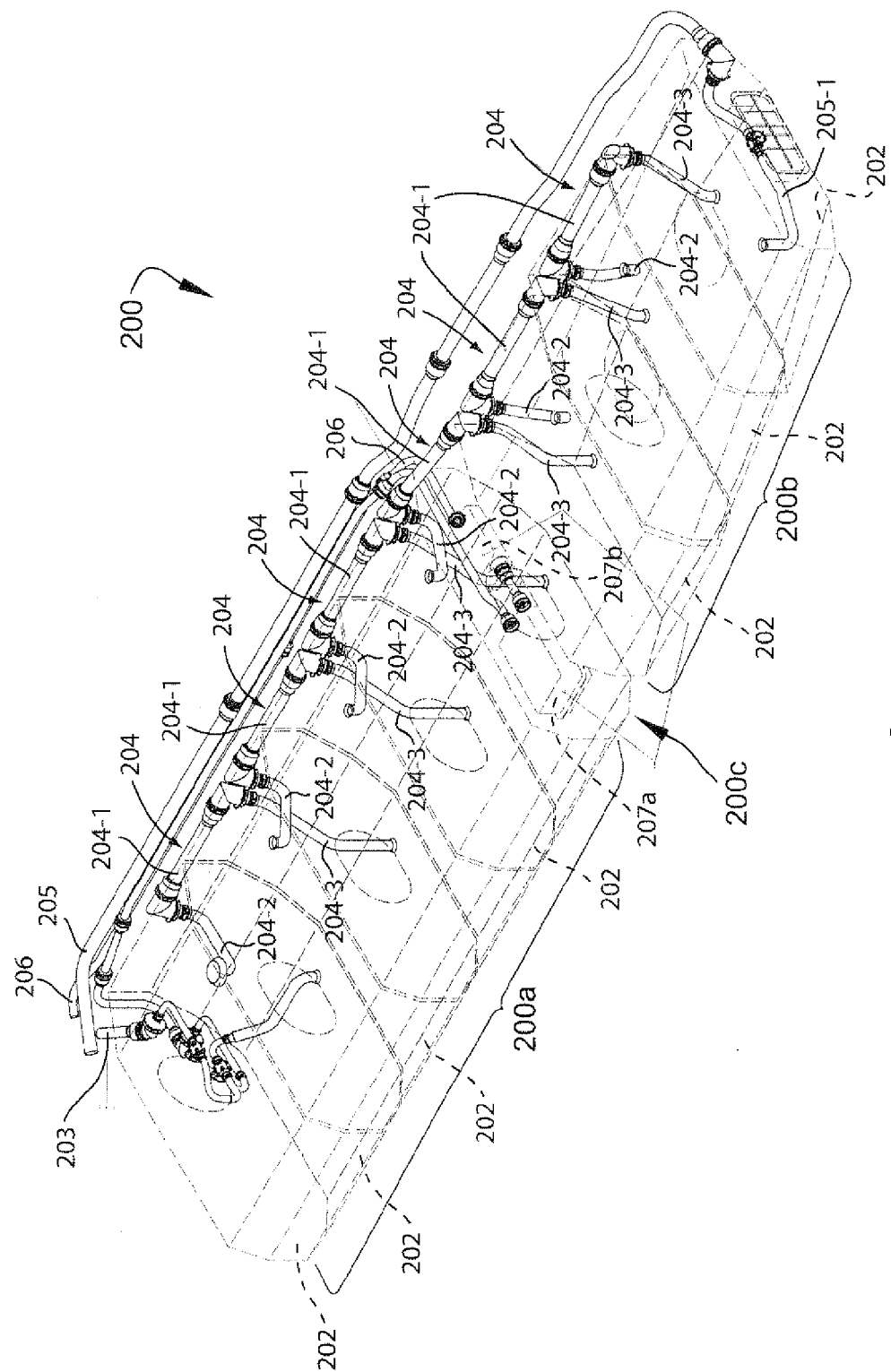
FIG. 7 is a schematic top perspective view of the aft fuselage fuel tank system shown in FIG. 1, and specifically depicts a cascade type intercommunication system between each of the fuel tank modules (intercommunication lines) including the ventilation line, the transfer control boxes, the transfer line and the refuel line.
Figure 8:
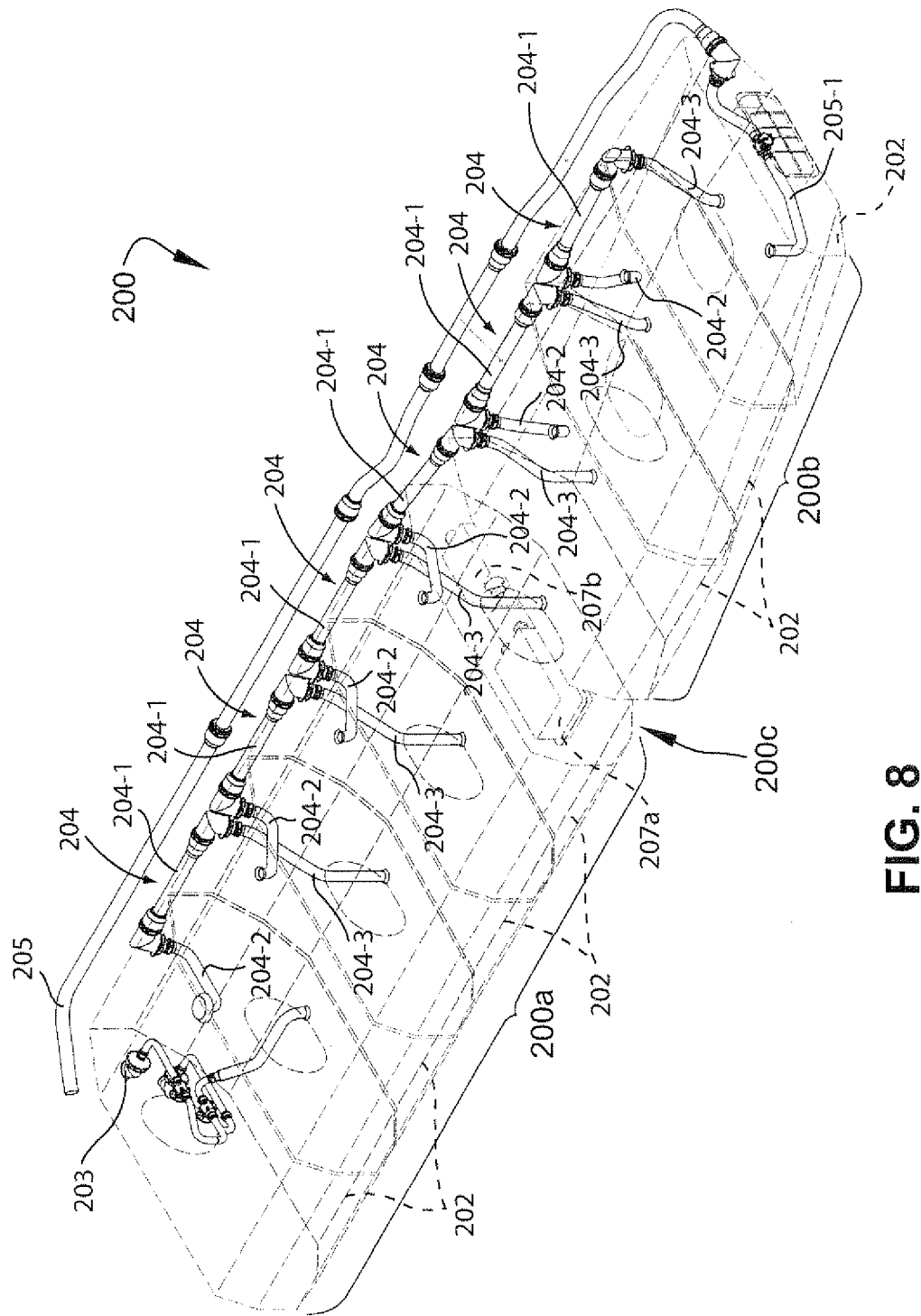
FIG. 8 is another schematic top perspective view of the aft fuselage fuel tank system shown in FIG. 7, showing the tank intercommunication line and the ventilation line and also partially showing the refueling line.
Figure 9:
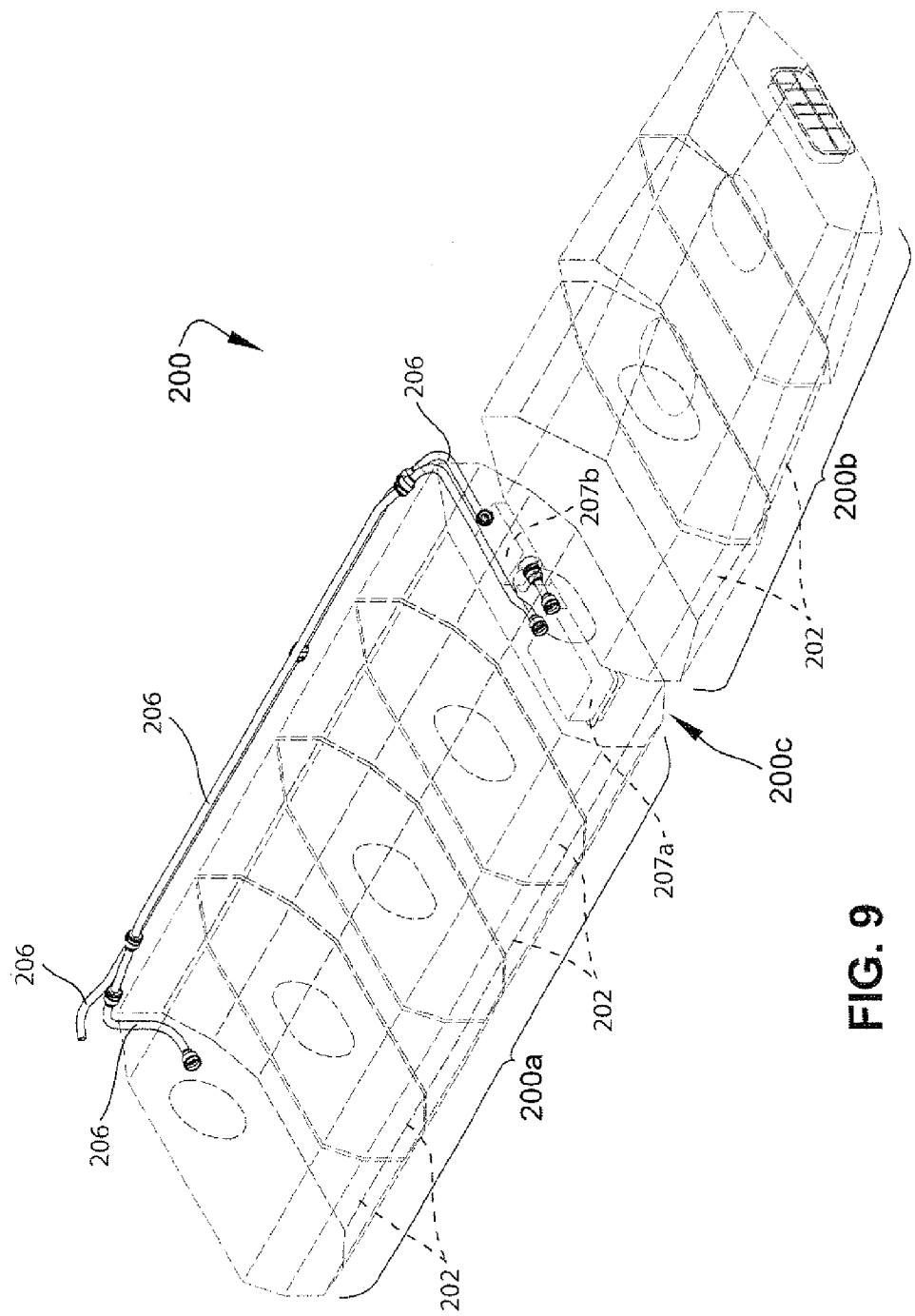
FIG. 9 is a schematic top perspective view of the aft fuselage fuel tank system shown in FIG. 6, but showing only the fuel transfer lines.

As is perhaps more clearly shown in FIGS. 5 and 6, the conduit 104-3 is connected at its upper end to the manifold conduit 104-1 and extends downwardly so its opposite end terminates near the bottom wall of the tank 102. The conduit 104-2 is connected to its upper end to the manifold conduit 104-1 and extends into the tank 102 so as to terminate at an inlet opening (preferably flared) 104-4 that is in spaced relationship to the upper wall 102-1 of the tank 102 by a dimension "H". The dimension "H" which separates the inlet opening 104-4 of the conduit 104-2 from the upper wall of the tank 102 will thus predetermine the ullage 102-2 within each of the tanks 102.

The fuel tanks 102 are thus fluid-interconnected to one another by means of the intercommunication conduit assemblies 104 so that each of the fuel tanks 102 is refueled in a cascade mode, that is in such a manner that the fuel tank 102 nearest to the wing main fuel tank is refueled first. After the first tank 102 is supplied with fuel via the fuel supply conduit 103, the fuel will thus flow thus through that intercommunication conduit assembly 104 and into the next fuel tank 102 in series thereby supplying it with fuel. In a successive like manner, all of the fuel tanks 102 in the forward tank system 100 can be supplied with fuel.

The tanks 102 also are ventilated in a cascade mode until the last fuel tank 102 in the series (i.e., for the forward fuel tank system 100 this would be the forward-most one of the tanks 102) which then provides a vent path via internal vent conduit 105-1. A ventilation conduit 105 external to the tanks 102 is provided and connected to the internal vent conduit 105-1 associated with the last tank of the series so as to provide a vent path to the main tank of the wing and/or to a point directly in the fuselage so that the ventilation of fuel vapors is accomplished in an appropriate region within the aircraft (e.g., surge tank of the wing tank).

During the fuel transference from the forward auxiliary tanks 102 to the wing main tanks, the fuel is transferred in an inverse sequence of the refueling operation. That is, the fuel tanks 102 are emptied in a reverse order of the refueling. This can be done by several known means, such as fuel pumps, utilizing differential pressure between the aircraft cabin and atmosphere, air bleed from the engine or APU, compressed air, and the like. A fuel transfer conduit 106 is thus only connected to the fuel tank 102 nearest to the main wing fuel tanks and is thus capable of transferring fuel to the wing main tank or alternatively directly to the engines 10-3 as may be controlled by valves located within the transfer control boxes 107a and 107b.

The aft tank system 200 is generally quite similar structurally and functionally as compared to the tank system 100 described above. Thus, structures depicted in accompanying FIGS. 7-11 associated with the aft tank system 200 have similar reference numerals as compared to the structures of the forward tank system 100, except that the reference numerals for the former are in a "200" series of numbers whereas the reference numerals for the latter are in a "100" series of numbers.

It will be observed that the aft tank system 200 includes a series 200a of larger capacity tanks 202 located generally forwardly of the aircraft and a series 200b of smaller capacity tanks 202 located generally rearwardly of the aircraft. The tanks 202 are arranged longitudinally adjacent one another generally along the longitudinal axis of the aircraft 10. A space 200c may exist between the series 200a and 200b of tanks 202 so as to accommodate the control boxes 207a and 207b associated operatively with the fuel transfer conduit 206.

As with the forward tank system 100, the adjacent pairs of the fuel tanks 202 of the aft tank system 200 are interconnected to one another by intercommunication conduit assemblies 204 which include an intercommunication manifold conduit 204-1 positioned exteriorly of the tanks 202. The conduit 204-1 will have one end fluid connected to an inlet conduit 204-2 and its other end fluid-connected to a discharge conduit 204-3. Each of the conduits 204-2 and 204-3 is positioned within the internal space of a respective one of the adjacent pairs of tanks 202.

Figure 11:
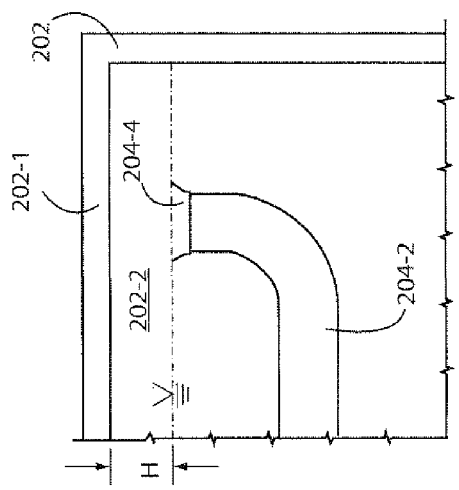
FIG. 11 is a schematic detail view of the tank depicted in FIG. 11 to maintain the ullage configuration whereby the quantity of the ullage can be configured for each module in equal or different values of ullage volume by preselected setting of the dimension "H"
Figure 10:
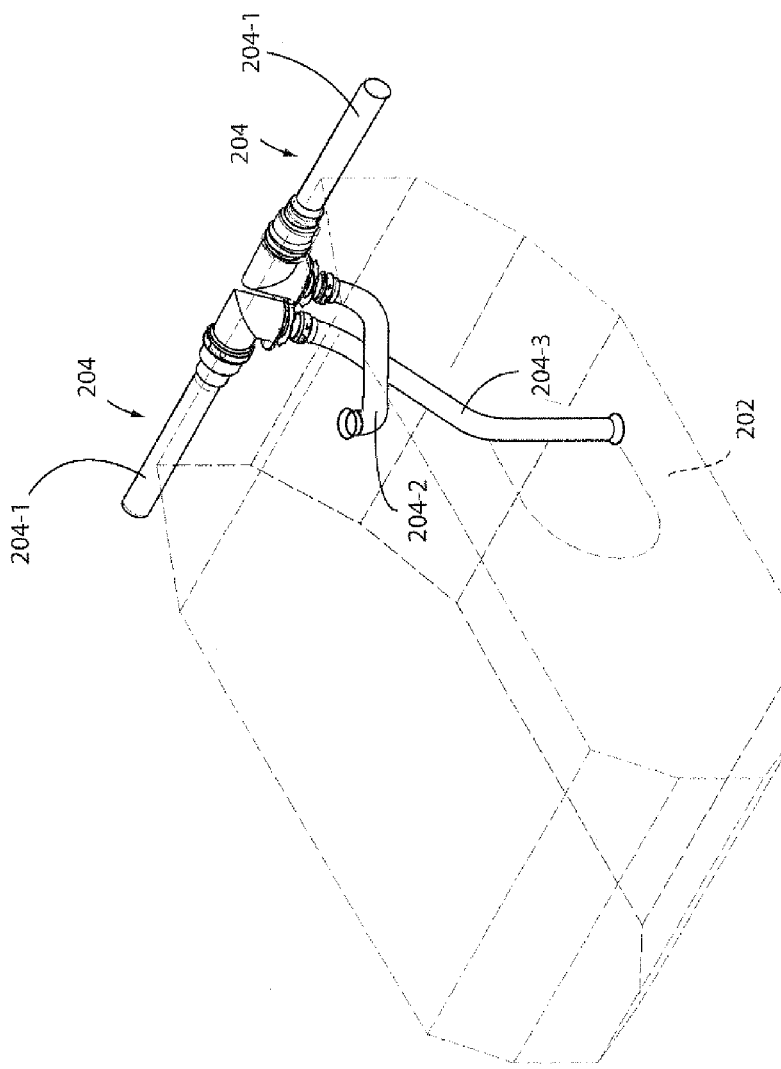
FIG. 10 is a schematic top perspective view of the aft fuselage fuel tank system shown in FIG. 7, but showing only the tank with an ullage relief configuration.

As is perhaps more clearly shown in FIGS. 10 and 11, the conduit 204-3 is connected at its upper end to the manifold conduit 204-1 and extends downwardly so its opposite end terminates near the bottom wall of the tank 202. The conduit 204-2 is connected to its upper end to the manifold conduit 204-1 and extends into the tank 202 so as to terminate at an inlet opening (preferably flared) 204-4 that is in spaced relationship to the upper wall 202-1 of the tank 202 by a dimension "H". The dimension "H" which separates the inlet opening 204-4 of the conduit 204-2 from the upper wall 202-1 of the tank 202 will thus predetermine the ullage 202-2 within each of the tanks 202.

The fuel tanks 202 are thus fluid-interconnected to one another by means of the intercommunication conduit assemblies 204 so that each of the fuel tanks 202 is refueled in a cascade mode, that is in such a manner that the fuel tank 202 nearest to the wing main fuel tank is refueled first. After the first tank 202 is supplied with fuel via the fuel supply conduit 203, the fuel will thus flow through that intercommunication conduit assembly 204 and into the next fuel tank 202 in series thereby supplying it with fuel. In a successive like manner, all of the fuel tanks 202 in the aft tank system 200 can be supplied with fuel.

The tanks 202 also are ventilated in a cascade mode until the last fuel tank 202 in the series (i.e., for the aft fuel tank system 200 this would be the aft-most one of the tanks 202) which then provides a vent path via internal vent conduit 205-1. A ventilation conduit 205 external to the tanks 202 is provided and connected to the internal vent conduit 205-1 associated with the last tank of the series so as to provide a vent path to the main tank of the wing and/or to a point directly in the fuselage so that the ventilation of fuel vapors is accomplished in an appropriate region within the aircraft (e.g., surge tank of the wing tank).

During the fuel transference from the aft auxiliary tanks 202 to the wing main tanks, the fuel is transferred in an inverse sequence of the refueling operation. That is, the fuel tanks 202 are emptied in a reverse order of the refueling. This can be done by several known means, such as fuel pumps, utilizing differential pressure between the aircraft cabin and atmosphere, air bleed from the engine or APU, compressed air, and the like. A fuel transfer conduit 206 is thus only connected to the fuel tank 202 nearest to the main wing fuel tanks and is thus capable of transferring fuel to the wing main tank or alternatively directly to the engines 10-3 as may be controlled by valves located within the transfer control boxes 207a and 207b.

The cascade mode of fluid intercommunication between fuel tanks 102, 202 in the tank systems 100, 200, respectively, allows the adoption of only one fluid line between the fuel tanks. This in turn results in a simpler, lighter and more practical system for manufacture, inspection and/or assembly.

The fuel system for the transport category aircrafts must comply with various specific requirements, including that the fuel tank be structurally designed considering high longitudinal decelerations. If it is assumed that the fuel tanks are totally full (i.e., without any internal air space), the pressure of the fuel column during a high deceleration could reach 70 psig because the longitudinal length of the forward and/or aft tanks, during high decelerations, would then be in essence the proper fuel column. In this case, the design of the fuel tank would result in a much heavier auxiliary tank system due the structural reinforcements necessary to withstand such increased design pressure loads. As a result of such increased weight, the entire auxiliary fuel tank design project could be jeopardized as unviable.

To solve this problem, auxiliary fuel tank systems may employ a variety of overpressure safety components, such as check valves, swing valves and/or restrictors of all types between each fuel cell to reduce the entire fuel column of all tanks aligned during high decelerations to a single column equivalent to the unique cell. Such techniques are not however ideal solutions to the problem because the components required in such a design present hidden failure possibilities. That is, the flight crew is not provided with any indication about the integrity of the components. This characteristic could therefore adversely affect the reliability and dispatch readiness of the aircraft due the frequent physical inspections that these types of components would require.

Another solution to this problem is the use of shut off valves in each fuel cell to control the refueling and transfer operations without hidden failures. In such a solution, these types of valves may then be electronically monitored with various sensors. However, this prior solution increases the complexity and cost of the auxiliary fuel system to such an extent that it may become unviable for medium and small aircraft due the small fuel tanks that these kinds of aircraft could carry.

To solve these problems and to maintain the competitiveness of the auxiliary fuel system product, one preferred embodiment of the present invention provides a means to comply with these requirements. Specifically, according to a preferred embodiment of this invention, calculated air volumes are provided intentionally inside at least some or each one of the fuel cells so that during a high deceleration event, the air volumes are available to physically damp the fuel column pressure of the respective cells. In such a manner, therefore, the magnitude of the fuel pressure column may be maintained at a value lower than that which would be reached without such air volumes as depicted in accompanying FIGS. 12 and 13. Such a configuration can thus be provided so that the pressure in each fuel tank 102 (202) is optimally not greater than the pressure that is equivalent to the length of that particular fuel tank 102 (202). This design flexibility allows that the structures of the fuel tanks can be optimized, with the beneficial consequence being that the fuel tanks can be structurally lighter.

Another advantage is that conventional overpressure safety components and/or shut-off valves between the fuel cells are not necessarily required thereby eliminating their attendant hidden failure modes and increasing the dispatch reliability and availability of the aircraft.

The air volumes can be induced in all or only some of the tanks 102 (202) in the series of tank systems 100 (200), respectively, by the controlled design of the height "H" between an open-ended extremity 104-4 (204-4) of the internal conduits 104-2 (204-2) and the top walls 102-1 (202-1) of each of the tanks 102 (202), respectively (see FIGS. 6 and 11). In this regard, the greater the dimensional height (i.e., the dimension "H" in FIGS. 6 and 11), the greater will be the stored air volume within the fuel tank 102 (202). This characteristic thereby allows equal or different air volumes of ullage 102-2 (202-2) to be provided in each fuel tank 102 (202), respectively, by the predetermined setting of the necessary distance between the open-ended extremity 104-4 (204-4) within each fuel tank 102 (202) the internal top wall of such fuel tank 102 (202). For example, as shown in FIG. 12, the distance between the open-ended extremity 104-4 (204-4) of the internal conduits 104-2 (204-2) and the top walls 102-1 (202-1) of each of the tanks 102 (202) is unequal and increasingly lesser (relative to the aft direction of the aircraft 10 in flight) distances H1, H2 and H3, respectively.

Each air volume ullage 102-2, 202-2 can thus be optimized. An example for how optimize the air volume ullage 102-2, 202-2 within each fuel tank 102, 202, respectively, can be determined as follows:

1. Define the capacity of the auxiliary fuel tanks;
2. Define the maintenability, costs, dispachability, market and customer requirements (eventually other requirements can be added or eliminated);
3. Make a conceptual design of the auxiliary fuel system;
4. Calculate the pressure drop of the intercommunication lines;
5. Determine the preliminary definition of how much ullages will be necessary to be left in some modules or in all of them;
6. Considering the structural limits of the each tank, loads of acceleration and deceleration, pressure drop of the intercommunication lines and the requirements, the ullages can be optimized for damping the fuel column during the high acceleration or decelerations; and
7. With the definition of how much ullage will be necessary in each module, the design of the intercommunication conduits can be reviewed to assure that the portion of air inside the fuel tanks can be assisted.

The steps 4 to 7 above should be repeated until the all ullages inside each module accomplish all of the defined requirements until the final design can be released.

According to the description above, the various embodiments of the present invention will advantageously provide a number of benefits. For example, damping ullage air may be applied in one or more fuel tank modules to comply with load requirements without necessarily using conventional overpressure safety components such check valves, baffle valves, shut off valves, and the like. Damping ullage air may be applied in one or more fuel tank modules to comply with any type of longitudinal, transversal or vertical load requirements without necessarily using conventional overpressure safety components such as check valves, baffle valves, shut off valves, and the like. In addition, damping ullage air may be applied in one or more tank modules for fuel or any kind of liquid (water, waste and the like), to comply with any type of longitudinal, transversal or vertical load requirements in an aircraft without necessarily using conventional overpressure safety components as described above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft fuel tank system comprising:
a series of multiple fuel tanks; and
intercommunication conduit assemblies fluid-connecting pairs of adjacent fuel tanks in the series to establish a cascade mode of fuel flow serially from one tank to another tank in the series of multiple fuel tanks, wherein the intercommunication conduit assemblies comprise:
  (i) an external manifold conduit spanning a distance between an adjacent pair of the fuel tanks,
  (ii) an inlet conduit connected to one end of the manifold conduit and extending within an interior of a first tank of the adjacent pair, and
  (iii) a discharge conduit connected to an opposite end of the manifold conduit and extending within an interior of a second tank of the adjacent pair, and wherein the inlet conduit has an open end which is separated from a top wall of the first tank by a predetermined distance to establish ullage volume within the first tank.

2. An aircraft fuel tank system as in claim 1, wherein the predetermined distance in one of the fuel tanks in the series is equal to the predetermined distance in other fuel tanks in the series.

3. An aircraft fuel tank system as in claim 1, wherein the predetermined distance in one of the fuel tanks in the series is different than the predetermined distance in other fuel tanks in the series.

4. An aircraft fuel tank system as in claim 1, further comprising a vent conduit connected to a last tank in the series of fuel tanks for venting the fuel tanks.

5. An aircraft fuel system as in claim 1, further comprising a transfer line fluid-connected to a first tank in the series of fuel tanks for transferring fuel from the fuel tanks.

6. An aircraft fuel system as in claim 1, further comprising a refuel conduit fluid-connected to a first tank in the series of fuel tanks for refueling the fuel tanks.

7. An aircraft fuel system comprising:
a series of adjacent multiple fuel tanks each having an internal volume for holding fuel for the aircraft;
intercommunication conduit assemblies fluid-connecting pairs of adjacent fuel tanks in the series to establish a cascade mode of fuel flow serially from one tank to another tank in the series of multiple fuel tanks, wherein the intercommunication conduit assemblies establish an air-filled ullage within the internal volume of at least one of the fuel tanks in the series to damp fuel column pressure within the fuel tank in response to a deceleration force and thereby prevent a fuel overpressure condition within the fuel tank,
wherein the intercommunication conduit assemblies comprise:
  (i) an external manifold conduit spanning a distance between an adjacent pair of the fuel tanks,
  (ii) an inlet conduit connected to one end of the manifold conduit and extending within an interior of a first tank of the adjacent pair, and
  (iii) a discharge conduit connected to an opposite end of the manifold conduit and extending within an interior of a second tank of the adjacent pair, and wherein the inlet conduit has an open end which is separated from a top wall of the first tank by a predetermined distance to establish ullage volume within the first tank.

8. An aircraft fuel tank system as in claim 7, wherein the predetermined distance in one of the fuel tanks in the series is equal to the predetermined distance in other fuel tanks in the series.

9. An aircraft fuel tank system as in claim 7, wherein the predetermined distance in one of the fuel tanks in the series is different than the predetermined distance in other fuel tanks in the series.

10. An aircraft fuel tank system as in claim 7, further comprising a vent conduit connected to a last tank in the series of fuel tanks for venting the fuel tanks.

11. An aircraft fuel system as in claim 7, further comprising a transfer line fluid-connected to a first tank in the series of fuel tanks for transferring fuel from the fuel tanks.

12. An aircraft fuel system as in claim 7, further comprising a refuel conduit fluid-connected to a first tank in the series of fuel tanks for refueling the fuel tanks.

13. An aircraft which comprises an aircraft tank fuel system as in claim 1 or 7.

* * * * *